(12) United States Patent
Kwok et al.

(10) Patent No.: US 9,102,380 B2
(45) Date of Patent: Aug. 11, 2015

(54) BICYCLE DRIVEN BY HANDS

(75) Inventors: Yau Cheung Kwok, Shatin (HK); Lai Yin Johnson Li, Shatin (HK)

(73) Assignee: Lai Yin Johnson Li, Shatin, N.T. (HK)

( * ) Notice: Subject to any disclaimer, the term of this patent is extended or adjusted under 35 U.S.C. 154(b) by 25 days.

(21) Appl. No.: 14/238,913

(22) PCT Filed: Oct. 24, 2011

(86) PCT No.: PCT/CN2011/081158
§ 371 (c)(1),
(2), (4) Date: Jun. 30, 2014

(87) PCT Pub. No.: WO2013/023406
PCT Pub. Date: Feb. 21, 2013

(65) Prior Publication Data
US 2014/0353939 A1    Dec. 4, 2014

(30) Foreign Application Priority Data

Aug. 15, 2011  (CN) .......................... 2011 1 0232753

(51) Int. Cl.
*B62M 1/14*    (2006.01)
*B62M 1/16*    (2006.01)
*B62M 1/24*    (2013.01)

(52) U.S. Cl.
CPC . *B62M 1/16* (2013.01); *B62M 1/14* (2013.01); *B62M 1/24* (2013.01)

(58) Field of Classification Search
CPC ............. B62M 1/12; B62M 1/14; B62M 1/16
See application file for complete search history.

(56) References Cited

U.S. PATENT DOCUMENTS 5,354,251 A * 10/1994 Sleamaker ...................... 482/96
7,360,780 B1 * 4/2008 Tucker .......................... 280/244
(Continued)

FOREIGN PATENT DOCUMENTS

| CN | 2032594 | 2/1989 |
| CN | 2223249 | 3/1996 |
| CN | 2646017 | 10/2004 |

(Continued)

OTHER PUBLICATIONS

International Search Report for international application No. PCT/CN2011/081158, dated Apr. 19, 2012 (6 pages).

*Primary Examiner* — Joseph Rocca
*Assistant Examiner* — Gabriela C Craciun
(74) *Attorney, Agent, or Firm* — Hamre, Schumann, Mueller & Larson, P.C.

(57) ABSTRACT

The invention discloses a bicycle, which comprises a handlebar assembly (1); an upright tube (2) having a first end fixedly connected with the handlebar assembly (1) and a second end rotatably connected with a front fork arm (6); a rocker arm (14) extending from the second end of the upright tube towards a front wheel, thereby forming a driving lever with the upright tube; a flywheel (8) mounted on the front wheel; and a cable (16) having a first end fixed to a position (7) where an end of the front fork arm (6) is located, and a second end trained in a pulley (15) mounted at the free end of the rocker arm (14) to be fixed at the flywheel (8) of the front wheel. The free end of the rocker arm is movable forward and backward with forward and backward movement of the handlebar assembly, thereby causing rotation of the flywheel (8) through the cable so as to drive the front wheel to rotate. Unlike the conventional bicycles which are driven to move forward by the rear wheel using pedals only, the present invention makes a breakthrough in increased speed of the bicycle and allows for a whole-body-exercise of the rider.

10 Claims, 2 Drawing Sheets

(56) References Cited

U.S. PATENT DOCUMENTS

| | | | |
|---|---|---|---|
| 7,938,419 B2* | 5/2011 | Leslie | 280/244 |
| 7,946,963 B1* | 5/2011 | Schreiner | 482/57 |
| 2008/0067772 A1* | 3/2008 | Weagle | 280/124.134 |
| 2008/0174086 A1* | 7/2008 | Clemons et al. | 280/258 |

FOREIGN PATENT DOCUMENTS

| | | |
|---|---|---|
| CN | 201169358 | 12/2008 |
| EP | 0541136 | 5/1993 |
| EP | 2269905 | 1/2011 |
| NL | 8004317 | 3/1982 |

* cited by examiner

BICYCLE DRIVEN BY HANDS

FIELD OF THE INVENTION

This invention relates to the field of bicycle, and in particular, to a bicycle which can be driven by the hands of the rider.

BACKGROUND OF THE INVENTION

Conventional bicycles are driven through actuating the foot pedal device by the rider with his hands for holding the handlebar assembly for moving-forward control of the bicycle. In the art, there are also bicycles which are driven by hands of the rider.

Chinese Patent No. ZL03284276.7 (Publication number CN2646017Y), for example, discloses a bicycle for body workout which comprises a handlebar assembly and a front axle; and further comprises a front boost device having a boost frame hinged on the handlebar assembly, a boost lever, a retractable push lever and a retractable pull lever which are hinged with the boost frame respectively, and a crankshaft mounted on a support frame which is fixedly connected with the handlebar assembly, wherein the crankshaft is hinged with a second end of each of the boost lever, the retractable push lever and the retractable pull lever, and has at its first end a sprocket wheel in connection with an overrunning clutch mounted on the front axle through a chain set. This workout bicycle can be actuated through pulls and pushes of the boost frame to move forward, thereby allowing the upper limbs to get exercised. However, this type of bicycle requires additionally the mounting of the front boost device that includes the crankshaft, the sprocket wheel and the chain, etc. on the handlebar assembly, which is complex structurally and costly.

European Patent No. EP 0 541 136A1 discloses a mechanism which converts a front idle wheel of a bicycle in general into a drive wheel. The mechanism enables to temporarily convert the front wheel into a drive wheel, comprising: a lever hinged in front of and on top of a frame of the bicycle; a handle-bar fixed to the lever together with a catch, with a mobile stopping tooth to block/release the handle-bar which can be swung on a vertical plane; transmission organs, comprising a chain which engages a free wheel coaxial and fixed to the front wheel for transmitting the alternate movement given to the handle-bar to the free wheel; elastic return means for returning to the original position of the handle-bar; and control means for controlling the mobile stopping tooth. Likewise, this type of bicycle requires additionally the mounting of elements such as free wheel and chain set, which is also complex structurally and expensive.

As can be seen, the prior art hand-driven bicycles are generally provided with a driving mechanism mounted on their front wheel, and the driving mechanism generally comprises a sprocket wheel and a chain and may drive the motion of the front wheel by hands. This mechanism is similar to the driving mechanism of sprocket wheel and chain which are actuated by foot pedals in the conventional bicycles, and is therefore complex in structure and high in cost.

SUMMARY OF THE INVENTION

An object of the invention is to overcome the above shortcomings by providing a hand-driven bicycle which is relatively simple in structure and/or inexpensive.

In order to accomplish the above object, the present invention provides a bicycle, comprising: a handlebar assembly, an upright tube having a first end fixedly connected with the handlebar assembly, a front fork arm with which a second end of the upright tube is rotatably connected, a rocker arm extending from the second end of the upright tube towards a front wheel of the bicycle, a flywheel mounted on an axle of the front wheel, a pulley mounted at a free end of the rocker arm, a cable having a first end fixed at a position where an end of the front fork arm is adjacent to the flywheel and having a second end trained in the pulley and the flywheel to be fixed at the flywheel of the front wheel. The upright tube and the rocker arm are secured together to form a driving lever with the second end of the upright tube as a pivot, such that, when the handlebar assembly is caused to move forward and backward, the upright tube is driven to rotate around the pivot and the free end of the rocker arm rotates correspondingly, thereby causing rotation of the flywheel through the cable so as to drive the front wheel to rotate.

The cable is trained in the free end of the rocker arm via the pulley mounted at the free end of the rocker arm.

The bicycle further comprises a fixed hinge support mounted on the front fork arm and having a front end rotatably connected with the second end of the upright tube through a pin.

The bicycle further comprises at least one pre-loaded spring having a first end connected with a rear end of the fixed hinge support and a second end connected with a lock plate mounted fixedly on the upright tube, such that the pre-loaded spring connected with the lock plate is elongated along with the forward movement of the handlebar assembly to drive the rocker arm and the pulley on the free end of the rocker arm to come into proximity to the front fork arm, which in turn causes clockwise rotation of the cable to retract and get trained in the flywheel because the cable is connected to the flywheel with a clockwork spring; and that the pre-loaded spring retracts along with the backward movement of the handlebar assembly or when the forward movement of the handlebar assembly comes to a halt, to drive counter-clockwise extension of the cable by the driving lever, which in turn causes the flywheel to rotate and thereby driving the front wheel of the bicycle to rotate forward.

The bicycle further comprises a ratchet in operable connection with a brake system of the bicycle and a grooved plate provided with a plurality of teeth, and the upright tube runs through the ratchet and the grooved plate. The ratchet engages with the teeth of the grooved plate to lock the handlebar assembly so as to prevent the handlebar assembly from moving forward, such that the rider will not be losing balance on the bicycle when the brake system is actuated.

The grooved plate has a through-groove through which the upright tube runs and rotates around the pivot.

The ratchet comprises two ends in spaced relation, each of which is connected with the brake system through a brake cord of the ratchet.

The through-groove of the grooved plate are provided with a rubber buffer at each of its front and rear ends for absorbing shock caused by the rotation of the upright tube around the pivot in the through-groove.

The first end of the cable is fixed by a nail at a position where an end of the front fork arm is adjacent to the flywheel.

The flywheel is a unidirectional axial wheel, comprising a clockwork spring connected with the second end of the cable for clockwise retraction of the cable, for example.

The bicycle can further comprise one or two rear wheels, and a rear wheel driving mechanism which is actuated by foot pedals.

The bicycle of the invention allows riders to drive its front wheel by hands to move forward, in addition to driving the rear wheel by using the foot pedals. This represents a breakthrough in the conventional bicycles that merely rely on the feet of the rider to actuate the rear wheel of the bicycles for moving forward.

According to the invention, the rider of the bicycle can drive the front wheel of the bicycle to move forward by reciprocating the handlebar assembly (the driving lever) continuously with the hands of the rider, so as to increase the speed of the bicycle and to allow workout movements of both upper and lower limbs of the rider.

The bicycle of the invention has the advantages as follows:
the rider of the bicycle can perform workout on both upper and lower limbs concurrently;
the front wheel can be driven forward by the hands to increase the speed of the bicycle;
the workout effectiveness of the bicycle can be enhanced;
the rider of the bicycle can choose whether to cause the front wheel to move forward or not, or can drive the bicycle to move forward only by the front wheel using the handlebar assembly on even road, which provides the rider with the flexibility of using the front wheel or the rear wheel or using both to drive the bicycle to move forward;
the invention requires low costs and simple technologies; and
the continuous reciprocating movement of the handlebar assembly and/or the rocker arm of the bicycle of the invention can recharge effectively the batteries.

DETAILED DESCRIPTION OF THE PREFERRED EMBODIMENTS

For a better understanding of this invention, reference is made to the following detailed description of the invention and the preferred embodiments thereof in conjunction with the accompanying drawings.

Figure 1:
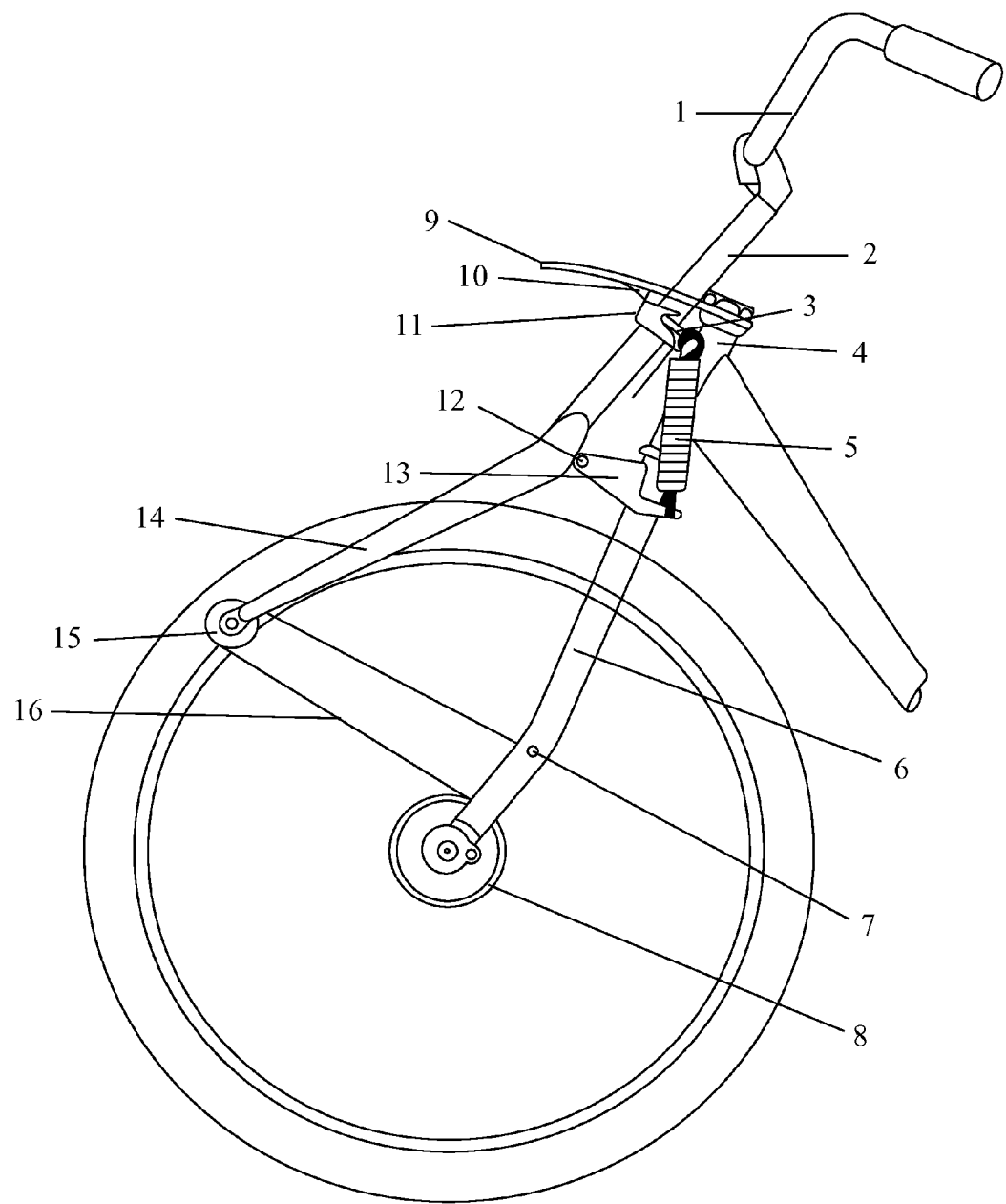
FIG. 1 shows a schematic side view of a front part of the bicycle according to a preferred embodiment of the invention, comprising a handlebar assembly, a front wheel and a corresponding hand-driven mechanism.

Referring to FIG. 1, there is illustrated a front part of the bicycle according to one preferred embodiment of the invention, comprising a handlebar assembly, a front wheel and a corresponding hand-driven mechanism.

It should be noted that the embodiment illustrated in FIG. 1 is based on a bicycle of two or three wheels. For the reason of simplicity, the saddle seat, the rear wheel and the conventional driving mechanism of the bicycle are not included in the illustration since they are well-known in the art.

The bicycle illustrated in FIG. 1 may be referred to as a "whole body-driven bicycle" which can be driven by hands or by feet or by both.

As shown in FIG. 1, the bicycle of the invention comprises a handlebar assembly 1, an upright tube 2 having a first end fixedly connected with the handlebar assembly, a front fork arm 6 with which a second end of the upright tube is rotatably connected, a rocker arm 14 extending from the second end of the upright tube towards a front wheel of the bicycle. The upright tube and the rocker arm are secured together to form a driving lever with the second end of the upright tube as a pivot, and the upright tube can rotate about the pivot. The bicycle further comprises a flywheel 8 mounted on an axle of the front wheel, a pulley 15 mounted at a free end of the rocker arm 14, and a cable 16 having a first end fixed at a position where an end of the front fork arm 6 is adjacent to the flywheel, and a second end trained in the free end of the rocker arm 14 via the pulley 15 to be fixed at the flywheel of the front wheel. When the handlebar assembly is caused to move forward and backward, the upright tube is then driven to rotate around the pivot and the free end of the rocker arm rotates correspondingly, thereby causing rotation of the flywheel 8 through the cable so as to drive the front wheel to rotate.

Preferably, the cable is trained in the free end of the rocker arm 14 via the pulley 15 mounted at the free end of the rocker arm 14.

The bicycle can further comprise a fixed hinge support 13 mounted on the front fork arm. The front end of the fixed hinge support 13 is rotatably connected with the second end of the upright tube through a pin 12.

Figure 3:
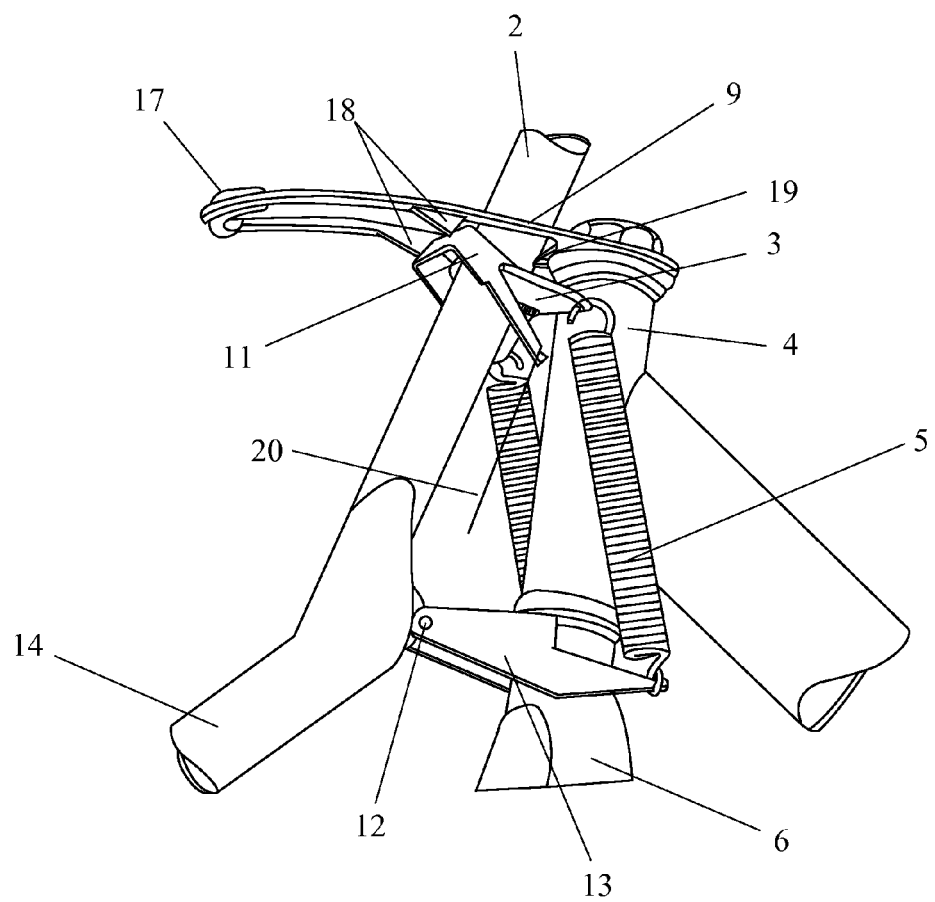
FIG. 3 shows an enlarged perspective view of a part of the bicycle comprising a grooved plate and a fixed hinge support shown in FIG. 1.

FIG. 3 is an enlarged perspective view of a part of the bicycle comprising a grooved plate and the fixed hinge support. As shown in FIG. 3, the bicycle further comprises two pre-loaded springs 5. Each of the pre-loaded spring 5 is connected at its first end with a rear end of the fixed hinge support, and connected at its second end with a lock plate 3 mounted fixedly on the upright tube, such that the pre-loaded spring connected with the lock plate is elongated along with the forward movement of the handlebar assembly to drive the rocker arm and the pulley on the free end of the rocker arm to come into proximity to the front fork arm, which in turn causes clockwise rotation of the cable to retract and get trained in the flywheel; and that the pre-loaded spring retracts along with the backward movement of the handlebar assembly or when the forward movement of the handlebar assembly comes to a halt, to drive counter-clockwise extension of the cable by the driving lever, which in turn causes the flywheel to rotate and thereby driving the front wheel of the bicycle to rotate forward.

Figure 2:
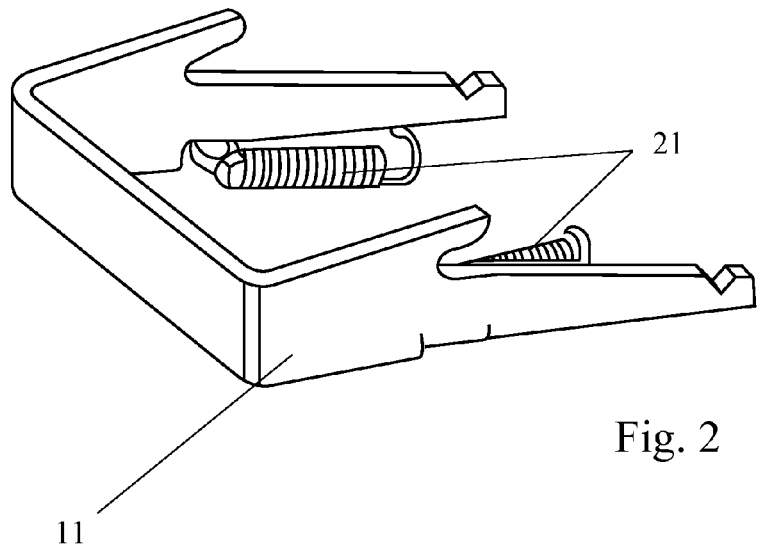
FIG. 2 shows a schematic perspective view of a ratchet of the bicycle shown in FIG. 1.

FIG. 2 is a schematic perspective view of a ratchet of the bicycle according to the invention. As shown in FIGS. 1 and 2, the bicycle further comprises a ratchet 11 in operable connection with a brake system of the bicycle (not shown) and a grooved plate 9 provided with a plurality of teeth. The upright tube runs through the ratchet and the grooved plate, and the ratchet engages with the teeth of the grooved plate to lock the handlebar assembly so as to prevent the handlebar assembly from moving forward, when the brake system is actuated.

The grooved plate 9 has a through-groove, and the upright tube runs through and swings in the through-groove.

The ratchet 11 comprises two ends in spaced relation, each of which is connected with the brake system through a brake cord 20 of the ratchet. As shown in FIG. 2, the two ends of the ratchet 11 are connected with a spring 21 respectively, so as to maintain the ratchet 11 in place.

The through-groove of the grooved plate is provided with rubber buffers 17 and 19 at each of its front and rear end for absorbing shock caused by the swinging of the upright tube in the through-groove.

The first end of the cable 16 is fixed in place by a nail 7 at a position where the end of the front fork arm 6 is adjacent to the flywheel.

The flywheel 8 can be a unidirectional axial wheel comprising a clockwork spring connected with the second end of the cable.

As seen in FIG. 1, the bicycle of the invention comprises a "driving lever", which consists of the handlebar assembly 1, the upright tube 2 and the rocker arm 14, mounted in front of the conventional front fork arm 6 and head tube 4. The fixed hinge support 13 mounted on the front fork arm is connected at its front end with the rocker arm 14 through a pin, and is fastened at its rear end to the bottom ends of a pair of pre-loaded springs. The top ends of the pair of pre-loaded springs are each fastened to the lock plate which is mounted on the upright tube provided with a ratchet. In addition, the upright tube also runs through the grooved plate positioned above the head tube and extending forward and through the ratchet located below the grooved plate; the cable is provided to extend from the nail positioned on the front fork arm adjacent to the axle of the front wheel to pass through the pulley at the bottom of the rocker arm and then return to the "unidirectional axial wheel/flywheel 8 comprising clockwork spring" (referred to as "unidirectional axial wheel" below) at the end of the front fork arm. This arrangement ensures that the front fork arm is driven by the "driving lever".

When the rider pushes the handlebar assembly forward by hands, the two pre-loaded springs fastened on the lock plate will become elongated, and drive the rocker arm and the pulley at its end to move backward and come into proximity to the front fork arm, which in turn causes clockwise rotation of the cable to retract and get trained in the unidirectional axial wheel (i.e. flywheel 8). When the pushing is released, the pre-loaded springs retract and accordingly the cable of the driving lever is energized to extend counter-clockwise from the unidirectional axial wheel adjacent to the end of the front fork arm, which in turn causes the front wheel of the bicycle to move forward. If, at the time during the backward force caused by the retraction of the pre-loaded springs is applied to the handlebar assembly, the rider concurrently pulls the handlebar assembly to move it backward, namely, the handlebar is forced to move backward, a greater force will be imposed on the front wheel to move faster.

As discussed above, the invention allows the handlebar assembly to be pushed and/or pulled by the hands, thereby driving the driving lever formed by the upright tube and the rocker arm to rotate around the pivot, which in turn drives the front wheel of the bicycle to rotate so as to drive the bicycle to move forward through the cable. The conventional driving mechanism of chain set and sprocket wheel is eliminated from the bicycle of the invention which, instead, uses a mechanism of cable and flywheel. This leads to the substantial reduction of production cost of the hand-driven mechanism, reduced weight of the bicycle, and improved effectiveness of the hand-driven mechanism.

According to the invention, the rider of the bicycle may make use of both hands to reciprocate the handlebar assembly and the "driving lever" continuously so as to drive the front wheel (or the rear wheel) of the bicycle to move forward. The bicycle of the invention can increase the speed of the bicycle and allow for a whole-body-exercise of the rider. This is a breakthrough in the conventional bicycles which are driven in general to move forward by actuating the rear wheel using pedals only.

In order to ensure the safety of the rider when sudden braking of the bicycle takes place, the ratchet is provided on the upright tube of the bicycle. The two ends of the ratchet are connected with the front and/or rear brake systems respectively. Referring to FIG. 2, when the front and/or rear brake system is actuated, the ratchet in connection with the front and rear brake systems would go up until it is blocked by and engaged with the plurality of teeth of the grooved plate, in such a manner the handlebar assembly is locked instantly. Such an arrangement reduces the risk of loss of balance of the rider when the brake system is actuated (referring to FIG. 3).

Furthermore, the rubber buffer is provided in the through-groove of the grooved plate at each of its front and rear ends for absorbing shock in the through-groove caused by the swinging of the "driving lever" formed by the handlebar assembly, the upright tube and the rocker arm (see FIG. 3).

Finally, when the handlebar assembly is reciprocated by the hands of the rider continuously to drive the bicycle forward, the reciprocation will not have an adverse impact on the conventional balancing and rotation of the handlebar assembly.

While the foregoing represents a description of principles and structures of the invention with reference to the preferred embodiments, it is to be understood that the description is illustrative and cannot be construed to limit the invention. Those skilled in the art will envision many other possible variations and modifications by means of the skilled person's common knowledge without departing from the scope of the invention; however, such variations and modifications should fall into the scope of this invention.

What is claimed is:

1. A bicycle comprising:
   a handlebar assembly (1);
   an upright tube (2) having a first end fixedly connected with the handlebar assembly (1);
   a front fork arm (6) with which a second end of the upright tube is rotatably connected;
   a rocker arm (14) extending from the second end of the upright tube towards a front wheel of the bicycle;
   a flywheel (8) mounted on an axle of the front wheel;
   a pulley (15) mounted at a free end of the rocker arm (14);
   a cable (16) having a first end fixed at a position where an end of the front fork arm (6) is adjacent to the flywheel, and a second end trained in the pulley (15) and the flywheel (8) to be fixed at the flywheel of the front wheel;
   wherein the upright tube and the rocker arm are secured together to form a driving lever with the second end of the upright tube as a pivot, such that, when the handlebar assembly is caused to move forward and backward, the upright tube is driven to rotate around the pivot and the free end of the rocker arm rotates correspondingly, thereby causing rotation of the flywheel (8) through the cable so as to drive the front wheel to rotate.

2. The bicycle as claimed in claim 1, wherein the cable is trained in the free end of the rocker arm (14) via the pulley (15) mounted at the free end of the rocker arm (14).

3. The bicycle as claimed in claim 1, further comprising a fixed hinge support (13) mounted on the front fork arm, said fixed hinge support having a front end rotatably connected with the second end of the upright tube through a pin (12).

4. The bicycle as claimed in claim 3, further comprising at least one pre-loaded spring (5) having a first end connected with a rear end of the fixed hinge support, and a second end connected with a lock plate (3) mounted fixedly on the upright tube, such that the pre-loaded spring connected with the lock plate is elongated along with the forward movement of the handlebar assembly to drive the rocker arm and the pulley on the free end of the rocker arm to come into proximity to the front fork arm, which in turn causes clockwise rotation of the cable to retract and get trained in the flywheel because the cable is connected to the flywheel with a clockwork spring; and that the pre-loaded spring retracts along with the backward movement of the handlebar assembly or when the forward movement of the handlebar assembly comes to a halt, to drive counter-clockwise extension of the cable by the driving lever, which in turn causes the flywheel to rotate and thereby driving the front wheel to rotate forward.

5. The bicycle as claimed in claim 1, further comprising a ratchet (11) in operable connection with a brake system of the bicycle, and a grooved plate (9) provided with a plurality of teeth, wherein the upright tube runs through the ratchet and the grooved plate, and the ratchet engages with the teeth of the grooved plate to lock the handlebar assembly so as to prevent the handlebar assembly from moving forward, when the brake system is actuated.

6. The bicycle as claimed in claim 5, wherein the grooved plate (9) has a through-groove through which the upright tube runs and rotates around the pivot.

7. The bicycle as claimed in claim 5, wherein the ratchet comprises two ends in spaced relation, each of which is connected with the brake system through a brake cord (20) of the ratchet.

8. The bicycle as claimed in claim 5, wherein the through-groove of the grooved plate is provided with a rubber buffer (19) at each of front and rear ends thereof for absorbing shock caused by the rotation of the upright tube around the pivot in the through-groove.

9. The bicycle as claimed in claim 1, wherein the first end of the cable (16) is fixed in place by a nail (7).

10. The bicycle as claimed in claim 1, wherein the flywheel (8) is a unidirectional axial wheel comprising a clockwork spring connected with the second end of the cable for retraction of the cable.

* * * * *